(12) United States Patent
Meulenkamp et al.

(10) Patent No.: US 8,544,638 B2
(45) Date of Patent: Oct. 1, 2013

(54) CONVEYOR BELT

(76) Inventors: Hennie Hermanus Jozef Meulenkamp, Hengelo (NL); Frans Bakker Beheer B.V., Hengelo Ov (NL)

(*) Notice: Subject to any disclaimer, the term of this patent is extended or adjusted under 35 U.S.C. 154(b) by 425 days.

(21) Appl. No.: 12/864,759

(22) PCT Filed: Jan. 28, 2009
(Under 37 CFR 1.47)

(86) PCT No.: PCT/NL2009/050040
§ 371 (c)(1),
(2), (4) Date: Jan. 10, 2011

(87) PCT Pub. No.: WO2009/096784
PCT Pub. Date: Aug. 6, 2009

(65) Prior Publication Data
US 2012/0037480 A1 Feb. 16, 2012

(30) Foreign Application Priority Data
Jan. 29, 2008 (NL) .................................. 2001235

(51) Int. Cl.
*B65G 15/54* (2006.01)
(52) U.S. Cl.
USPC ............................ 198/853; 198/848; 198/850

(58) Field of Classification Search
None
See application file for complete search history.

(56) References Cited

U.S. PATENT DOCUMENTS

| | | | |
|---|---|---|---|
| 3,127,980 A | 4/1964 | Lanham | |
| 3,225,898 A | 12/1965 | Roinestad | |
| 4,932,925 A | 6/1990 | Roinestad et al. | |
| 5,054,609 A * | 10/1991 | Poerink | 198/852 |
| 7,721,877 B2 * | 5/2010 | Maine et al. | 198/848 |

FOREIGN PATENT DOCUMENTS

EP 0377775 A1 7/1990

* cited by examiner

*Primary Examiner* — Kavel Singh
(74) *Attorney, Agent, or Firm* — The Webb Law Firm

(57) ABSTRACT

A conveyor belt includes a number of coupling elements, each having two links which are present on either side of a coupling element and which are each coupled to a link of an adjacent coupling element; a pin which extends between the two coupling elements and is connected to each of the two links; such that two mutually adjacent coupling elements can be moved out of the main plane and are mutually rotatable in the main plane. The conveyor belt has the feature that at least the most outward lying leg of a link has a third hole; the pin is inserted with its free end into the third hole of the link or a link of an adjacent coupling element; and the pin is substantially fixed relative to each link on the sides of the conveyor belt.

12 Claims, 9 Drawing Sheets

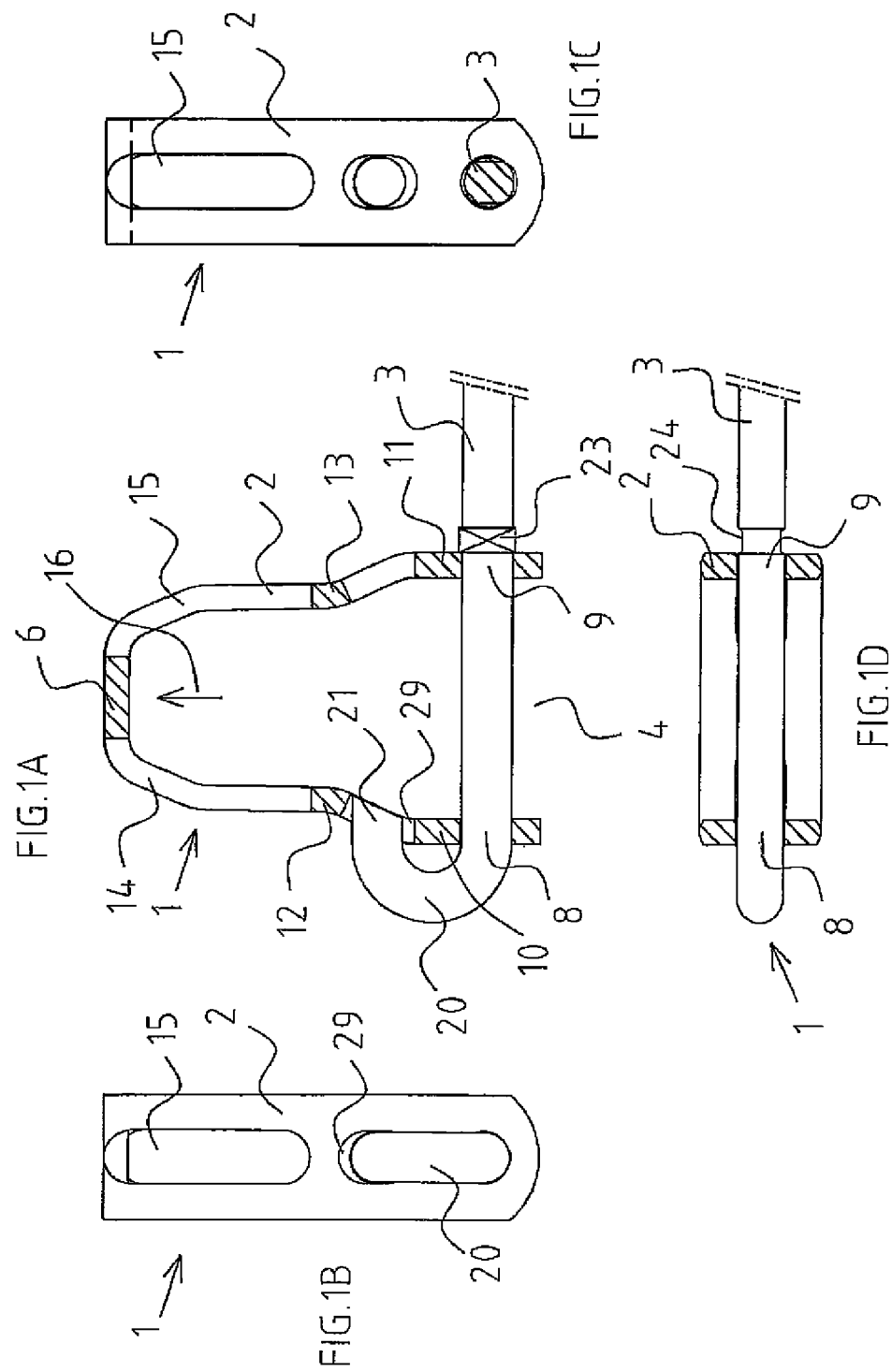

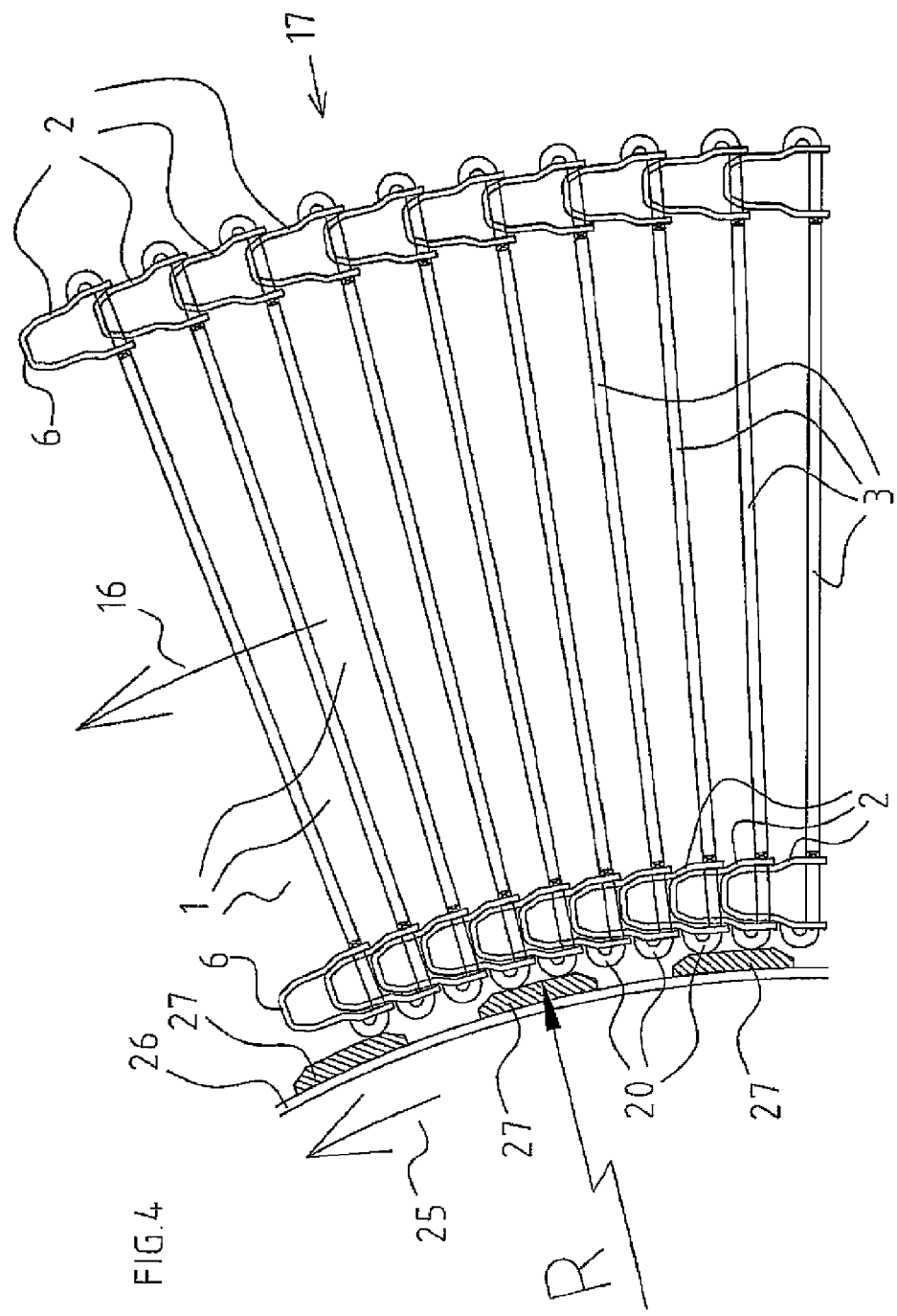

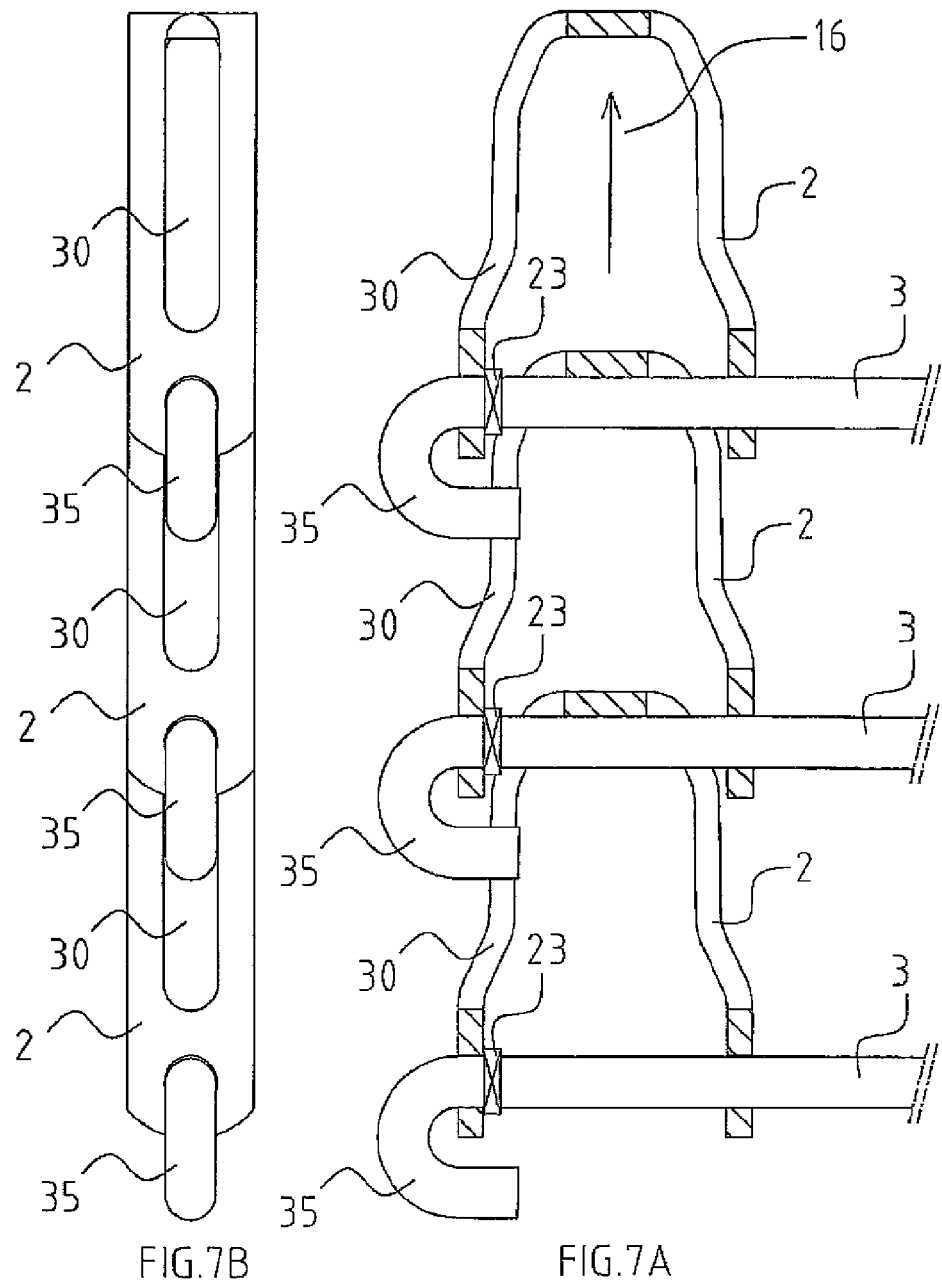

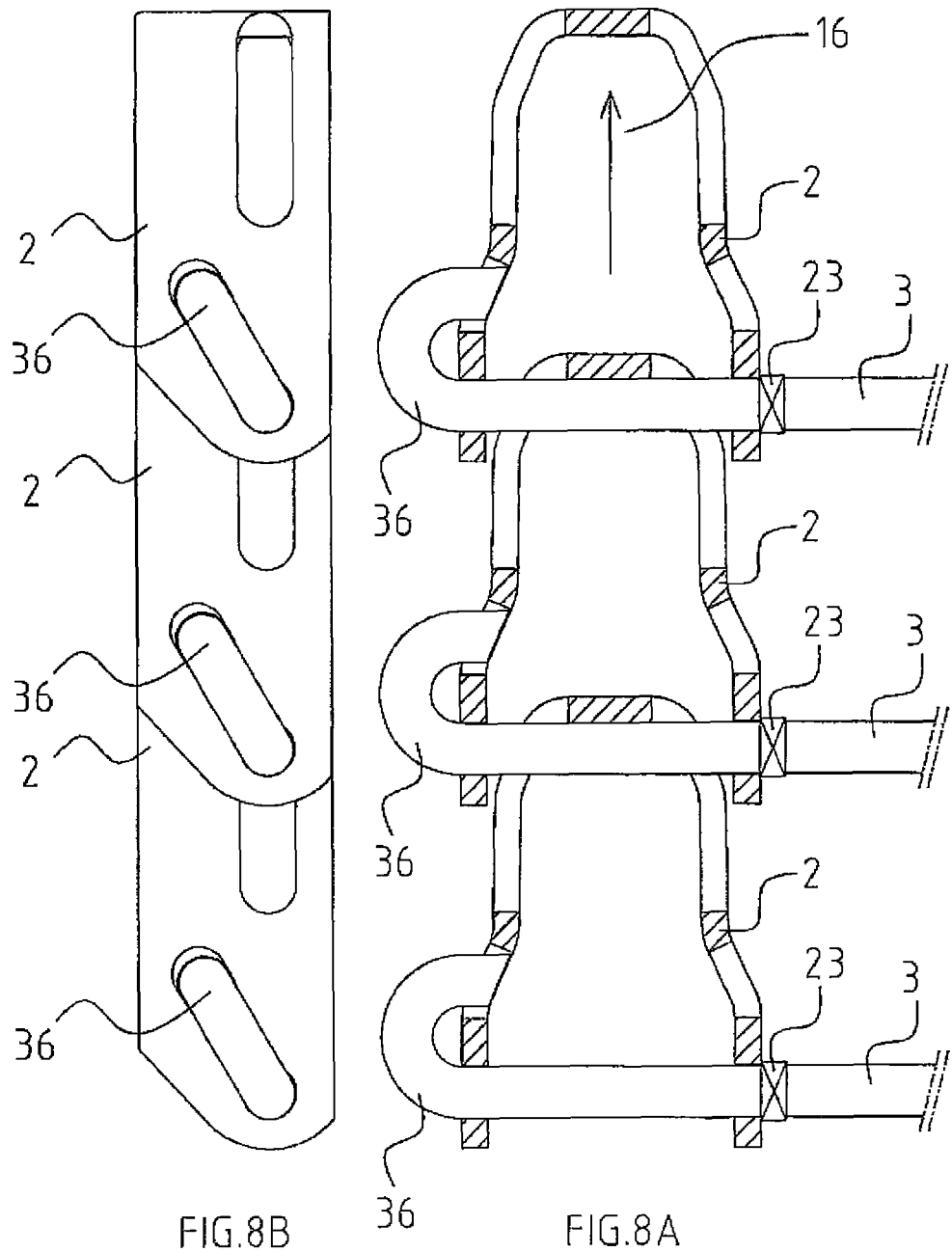

CONVEYOR BELT

BACKGROUND OF THE INVENTION

1. Field of the Invention

The invention relates to a conveyor belt with a main plane and a longitudinal direction defined in this main plane and corresponding to the transporting direction of the conveyor belt, which conveyor belt comprises a number of coupling elements, each comprising:

two links which are each present on a side of a coupling element and which are each coupled to a corresponding link of a longitudinally adjacent coupling element;

a pin which extends at least over a straight central part in transverse direction relative to the coupling elements and is connected to the outer two links, and which has a part which protrudes beyond the outer surface of a link and is bent through at least 90°;

at least one of which outer links has a general U-shape, which U extends in the main plane of the conveyor belt and has a form widening toward the open end, such that the relatively narrow zone at the closed end fits into the relatively wide zone at the open end of an adjacent link;

each of which pins extends in a substantially fixed relative position through two first continuous holes in the end zones of the legs of the U of the link, and without fixed relative position through two second continuous holes in the legs at the position of the relatively narrow zone of a preceding link, which second holes are embodied as slotted holes extending in longitudinal direction;

such that two mutually adjacent coupling elements can be moved out of the main plane and are mutually rotatable in the main plane.

2. Description of the Related Art

Such a conveyor belt is for instance known from EP-A-0 377 775.

This known conveyor belt comprises a number of pins which are bent through 180° on either side. The inward directed free ends are inserted into respective holes of corresponding links. In this prior art conveyor belt the straight central part of the pin is guided over the links and free ends bent through 180° are inserted into said continuous holes in the end zones of the legs of the U of the link. In this known conveyor belt the pin is welded fixedly onto the link.

A known conveyor belt comprises plastic or metal pins which extend substantially in transverse direction and are connected to the plastic or metal links. One or more metal or plastic carriers can be mounted between the links for the purpose of carrying products. Such a filling can for instance consist of spiral wire, plastic modules or the like. Such conveyor belts and carriers are generally known.

In respect of the two degrees of freedom of rotation, i.e. the pivotability out of the main plane and the rotatability in the main plane, conveyor belts of this type, which are also referred to as spiral belts, are applied mainly in so-called spiral towers, in which the conveyor belt is transported respectively upward and downward in the manner of a helix, whereby a great belt length is realized on a relatively small floor area. The conveyor belt is here trained around a driven vertical drum. The spiral belt is driven by friction between the vertical drum and the side surfaces of the spiral belt. It is important in this respect that the side surfaces of the belt are finished such that they cannot hook into or onto the drum or damage the drum.

The metal conveyor belts of the stated type currently available commercially are all provided with welded connections between the pins and the links.

SUMMARY OF THE INVENTION

It is an object of the invention to provide a conveyor belt which has excellent properties, has a high technical reliability and can be manufactured inexpensively.

It is a further object of the invention to provide a reliable driving of the side surfaces of the spiral belt by the drum in simple manner.

In this respect the conveyor belt according to the invention has the feature that at least the most outward lying leg of the link has a third hole;

the pin is inserted with its free end into the third hole of the link or a link of an adjacent coupling element; and the pin is substantially fixed relative to each link on the sides of the conveyor belt, i.e. is locked against substantial sliding and rotation.

It is noted that more than two links can be applied per coupling element. Two links are situated on the sides and serve, among other purposes, to transfer pulling forces for driving the conveyor belt by means of suitable toothed wheels or toothed rollers. Depending on the conditions of use, it may be useful to apply more than two links per coupling element, distributed over the width of the conveyor belt.

Said third hole can be formed separately of the slotted hole, i.e. the second hole. In an alternative however, the conveyor belt has the special feature that the third hole forms part of the second hole.

According to a very important aspect of the invention, the conveyor belt has the special feature that the protruding, bent part of the pin has small dimensions such that the conveyor belt, when curved in its said main plane, can assume a radius of curvature on its side directed toward the centre of curvature which is smaller than 3 times, and preferably 2.2 times, the width of the conveyor belt.

The bent protruding part of the pin is of essential importance according to the invention. The radius of the curve must be smaller in relation to the diameter of the pin than in the prior art to be able to comply with the required small radius of curvature of the conveyor belt. This ratio between the radius of curvature of the neutral bend line and the diameter of the pin must be less than 1.5.

So as to lock the pin against sliding and rotation relative to the links, the conveyor belt preferably has the special feature that the fixation of the pin to the link is ensured by a plastically deformed zone of the pin and/or link.

The conveyor belt can for instance have the special feature that the pin has a widened zone, this zone being too wide to pass through the hole, such that the pin is substantially fixed relative to the link by the widened zone and the bent part. The link is thus enclosed between the bent and the widened parts.

In a simple embodiment the conveyor belt has the feature that the widened zone is formed by flattening.

Alternatively, instead of providing the pin and/or the link with a plastically deformed zone it is also possible in some cases, depending on the forces occurring during driving of the conveyor belt, to apply pins with a non-round sectional form, to apply pins with different diameters in stepped relation, or to use pins whose outer end has a certain widening.

Such a construction also ensures that the links are locked against rotation relative to the transverse pin connected thereto. This locking is desirable in order to prevent a link rotating upward on the inner radius of the conveyor belt, whereby it can hook behind frame parts of the drum and/or the belt support, and the belt, the drum and/or the belt support can thus be damaged.

This rotation of a link relative to the pin can however also be blocked in other ways, also without a welded connection being used. A non-cylindrical form of the pin can for instance be chosen, or the pin and/or the link can be plastically deformed in suitable manner by mechanical means.

It is important that the protruding, bent part of the pin serves as drive surface when the conveyor belt is driven by the vertical drum. The bent form is highly suitable for preventing the pin from hooking behind frame parts.

As already discussed above, the conveyor belt can advantageously be embodied such that each coupling element is free of welded connections. A drawback of welding is the necessity of pickling and passivating, since the belt usually comes into direct contact with food products. Pickling and passivating serve to prevent corrosion.

Cracks and gaps in which micro-organisms can nestle and multiply are further created during the welding. These cracks are very difficult and sometimes even impossible to reach for a cleaning operation because the cracks are often closed on one side by the weld.

The quality of a welded connection further depends on many factors, such as the homogeneity of the materials for welding, contamination by oil, greases and/or drawing greases, the welding point of the welding torch and other factors. Due to embrittlement adjacently of the weld a pin can break prematurely at a completely unexpected moment, thereby causing shut-down of the production line. It is impossible to predict the occurrence of a bad weld. It is impossible to check every weld. Destructive testing would after all be necessary for this purpose.

Because welding operations are eliminated, the conveyor belt can be cleaned better than known conveyor belts because there are no longer any cavities, cracks and gaps which are closed on one side, and there is no further need for pickling and passivating, which reduces costs. The advantage is also gained of the material quality not being affected by the high welding temperatures, whereby less belt breakage occurs.

Finally, a great advantage of this aspect of the invention is that the reproducibility of the bending of the pin and a mechanical deformation for locking of the links and the pins is many times greater than with a welding process.

The conveyor belt can be embodied such that the pin is fixed relative to a link by at least one welded connection.

According to specific aspect, the conveyor belt has the special feature that the ratio between the radius of curvature of the neutral bend line and the diameter of the pin is smaller than 1.5.

According to another, optional aspect, the conveyor belt has the feature that the coupling elements are free of welded connections.

BRIEF DESCRIPTION OF THE DRAWINGS

The invention will now be elucidated with reference to the accompanying drawings of several exemplary embodiments, to which the invention is not limited. In the drawings:

FIG. 1A shows a section through a part of a coupling element according to the invention;

FIG. 1B shows a side view from the left-hand side of the coupling element according to FIG. 1A;

FIG. 1C shows a side view from the right-hand side;

FIG. 1D shows a section through the pin;

FIG. 4 shows a part of the conveyor belt which is driven by a drive drum through engagement with the bent end parts of the pins;

FIG. 7A shows a cross-section corresponding to FIG. 3A through a fourth exemplary embodiment;

FIG. 7B is a side view corresponding to FIG. 3B of the situation shown in FIG. 7A;

FIG. 8A shows a cross-section corresponding to FIG. 3A through a fifth exemplary embodiment;

FIG. 8B is a side view corresponding to FIG. 3B of the situation shown in FIG. 8A.

DETAILED DESCRIPTION OF THE PREFERRED EMBODIMENTS

Figures 2A, 2B:
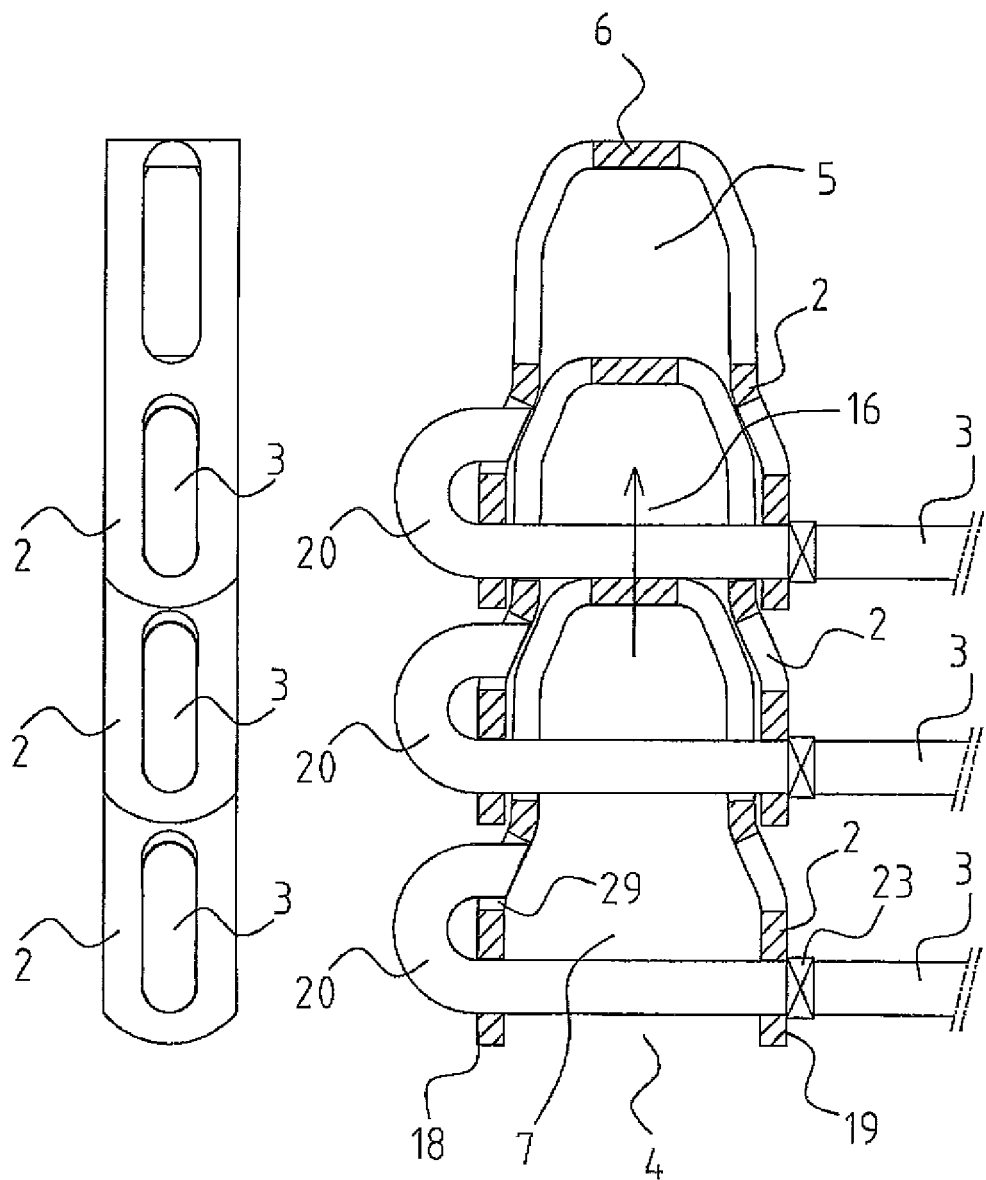
FIG. 2A shows a section corresponding to FIG. 1A through a part of a number of coupling elements, in a situation in which the coupling elements are pressed against each other and thus have a minimal mutual spacing.
FIG. 2B shows a side view corresponding to FIG. 1B of the situation according to FIG. 2A.

FIGS. 1-4 show a part of a conveyor belt 17. Coupling element 1 comprises two links 2 (see also FIG. 4), each present on a side of a coupling element 1 and each coupled to a corresponding link 2 of an adjacent coupling element. Extending between the two links 2 of a coupling element 1 is a pin 3, which is connected to links 2 of coupling element 1 in a manner to be specified below.

Each link 2 has a general U-shape. The U extends in the main plane of conveyor belt 17 and has a form widening toward open end 4 such that the relatively narrow zone 5 at closed end 6 fits into the relatively wide zone 7 at open end 4 in the manner as shown for instance in FIG. 2A.

Each of the pins 3 extends in a substantially fixed relative position through two first continuous holes 8, 9 in end zones 10, 11 of legs 12, 13 of the U of the link, and without fixed relative position through two second continuous holes 14, 15 in legs 12, 13 at the position of the relatively narrow zone 5 of a preceding link. These second holes 14, 15 are embodied as slotted holes extending in longitudinal direction 16.

Owing to the described structure two mutually adjacent coupling elements 1 can be moved out of the main plane of conveyor belt 17 and are mutually rotatable in the main plane. This latter aspect is shown particularly well in FIG. 4.

Each pin 3 protrudes beyond outer surface 18, 19 of a link, and a part 20 is bent thereover through more than 90° and is inserted with its free end 21 into a third hole 29 in the relevant leg 12 and/or 13.

On the side remote from the bent part the pin 3 has a widened zone 23 obtained by flattening. This widened zone 23 is too wide to pass through the first continuous hole 8, 9 such that pin 3 is substantially fixed relative to the link because the link cannot pass over either widened zone 23 or bent part 20.

FIG. 1D shows schematically that widened part 23 according to FIG. 1A corresponds to a flattened and therefore narrowed zone 24.

Figures 3A, 3B:
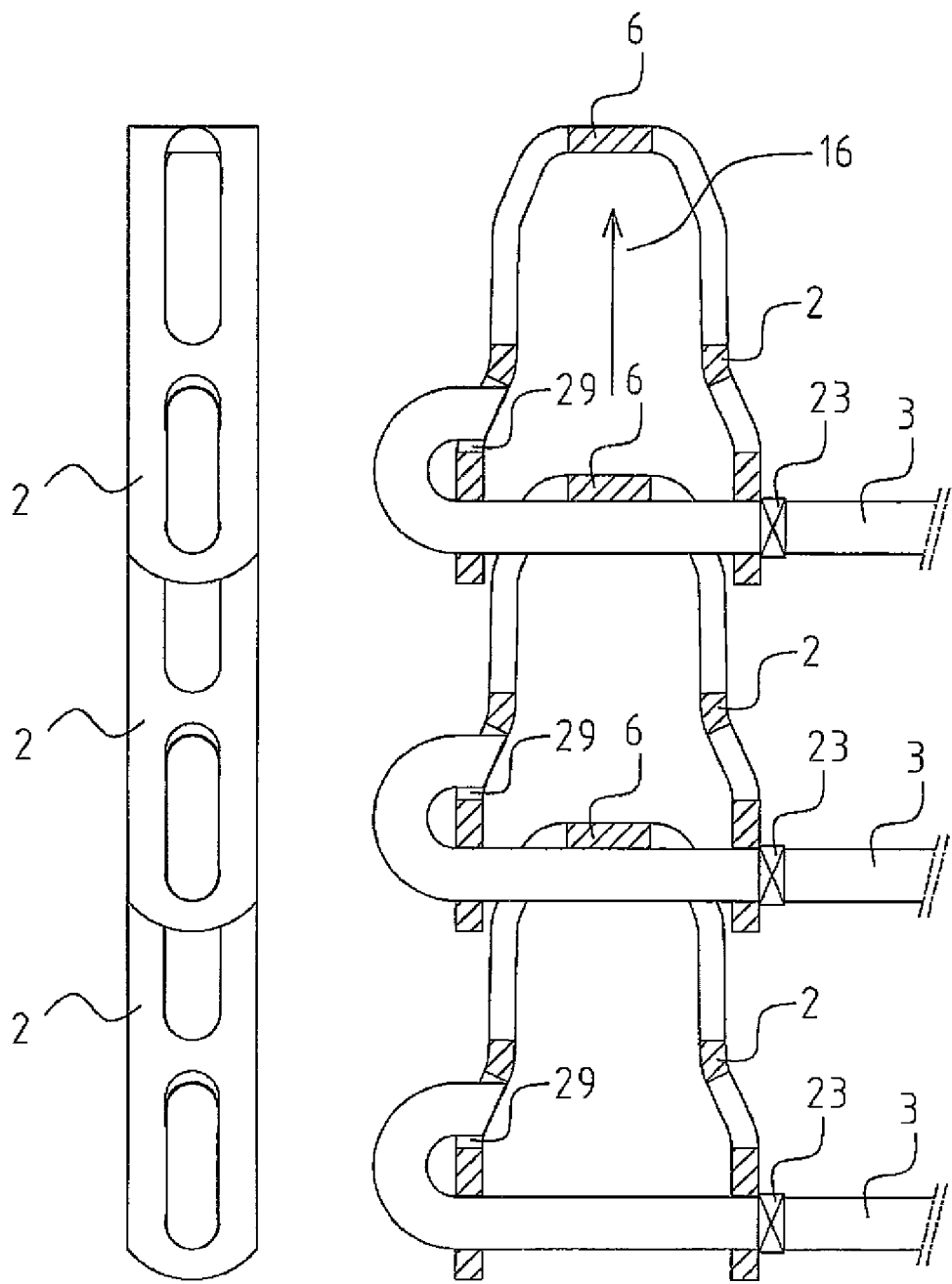
FIG. 3A shows a view corresponding to FIG. 2A of the situation in which the coupling elements are under strain of tension relative to each other and thus have the greatest possible mutual spacing.
FIG. 3B is a side view of the situation shown in FIG. 3A.
Figure 3C:
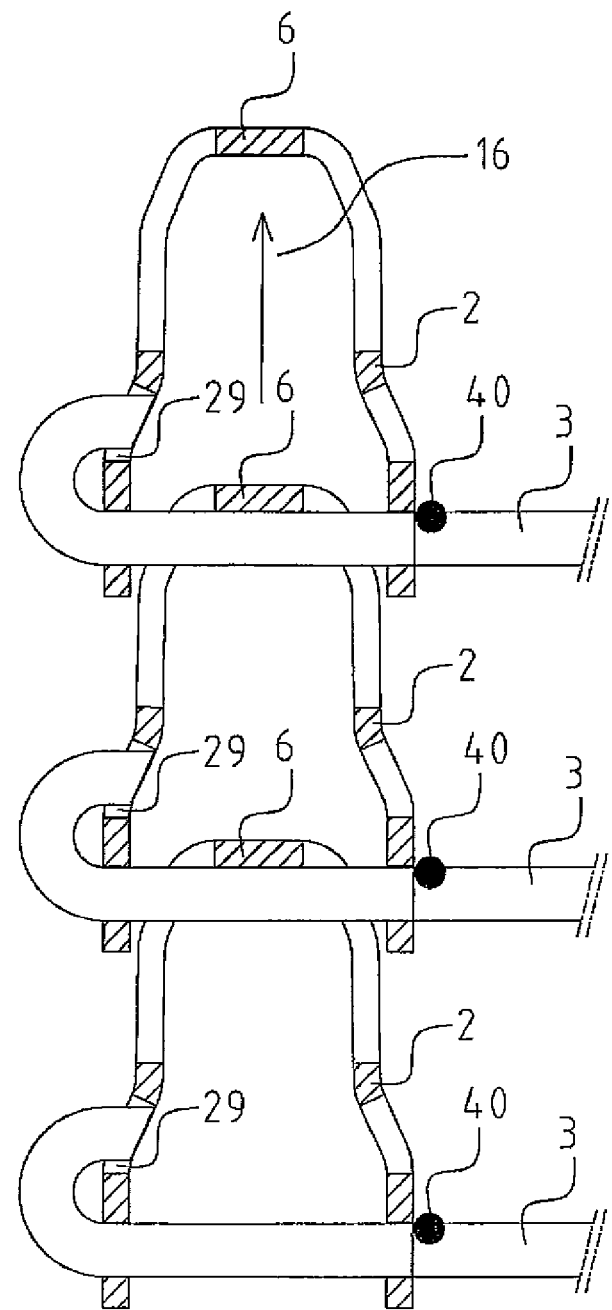
FIG. 3C shows a view corresponding to FIG. 3A of a variant in which the pin is not provided with a part widened by flattening, but with a widened part arranged by welding.

In the variant according to FIG. 3C the flattened and thereby widened part 23 is replaced by a widening 40 arranged by welding.

FIG. 4 shows schematically a drive drum 26 which is driven rotatingly in the direction of an arrow 25 and which engages the outer surfaces of bent parts 20 by means of friction elements 27 and thus drives conveyor belt 17, curved as according to FIG. 4, in a helical spiral path.

Figures 5A, 5B:
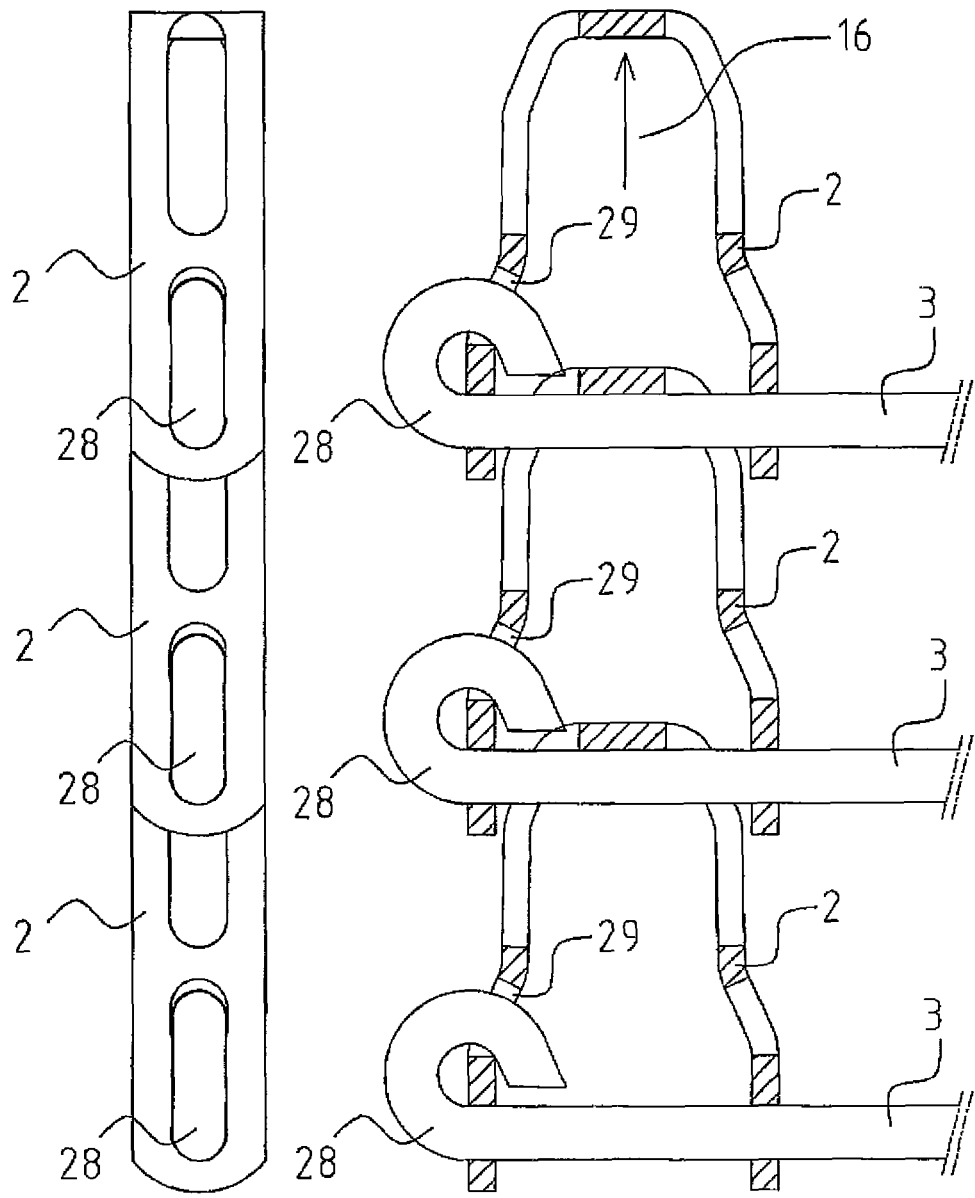
FIG. 5A shows a section corresponding to FIG. 3A through a second exemplary embodiment.
FIG. 5B is a side view of the situation shown in FIG. 5A.

FIGS. 5A and 5B show that a protruding part 28 of pin 3 is bent through an angle of more than 180° and that the end zone of part 28 is even bent so far that in the shown manner a rotation locking as well as an axial locking of pin 3 are obtained relative to link 2.

Figure 6B:
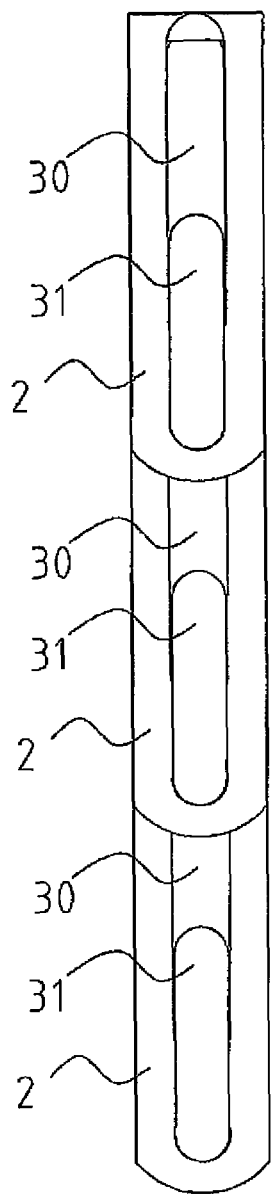
FIG. 6B is a side view corresponding to FIG. 3B of the situation shown in FIG. 6A.
Figure 6A:
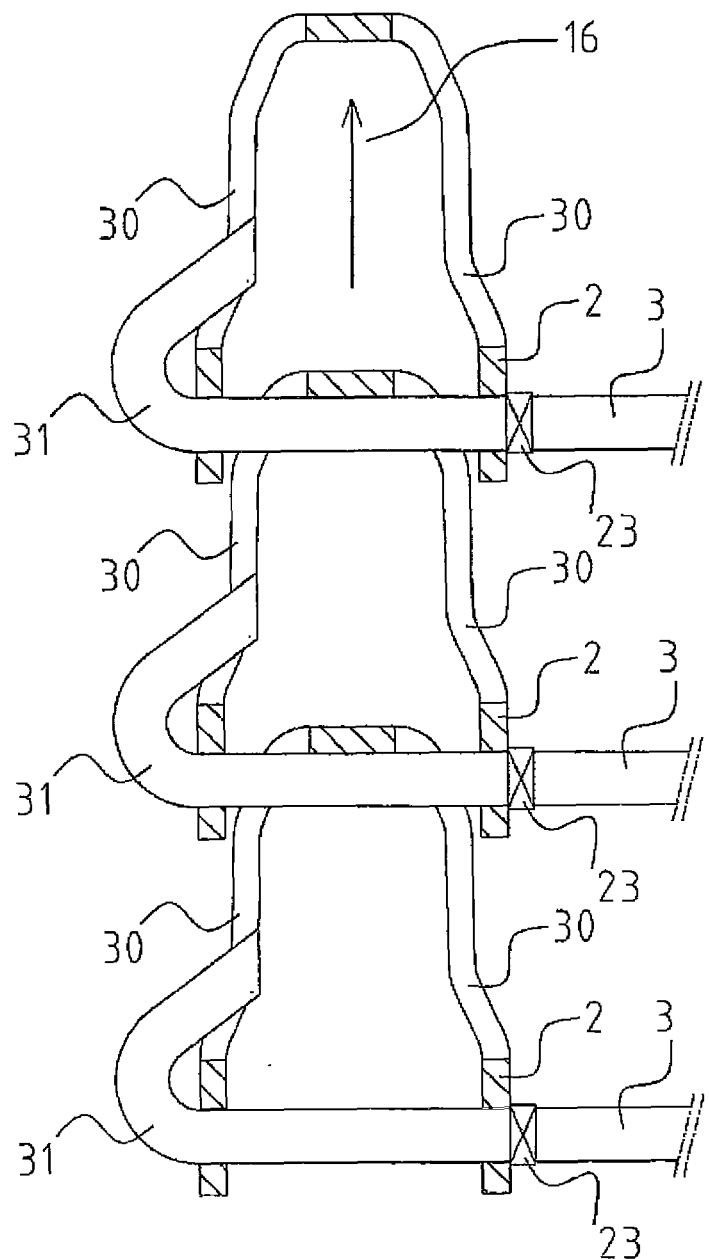
FIG. 6A shows a cross-section corresponding to FIG. 3A through a third exemplary embodiment.

FIGS. 6A and 6B show that slotted holes 30 fulfill the function of both second hole and third hole and are dimensioned correspondingly, and so have a greater length. Protruding part 31 of pin 3 is bent through an angle in the order of magnitude of 135°. A rotation locking of pin 3 relative to link 2 is hereby realized. A locking against axial displacement is ensured by the above discussed widened zone 23.

FIGS. 7A and 7B show an embodiment in which protruding part 35 of pin 3 is inserted into hole 30 of adjacent link 2, this hole forming both the second and the third hole.

FIGS. 8A and 8B show a variant of the embodiment according to FIG. 1. Other than in the embodiments shown and described above, in this embodiment the protruding parts 36 of pins 3 do not lie in the main plane of the conveyor belt but have an inclining position relative thereto, as shown particularly clearly in FIG. 8B.

It is noted that the angle shown in FIG. 8 is not limited to this exemplary embodiment. Other values of the angle are also possible.

The invention claimed is:

1. A conveyor belt having a main plane and a longitudinal direction defined in the main plane and corresponding to the transporting direction of the conveyor belt, wherein the conveyor belt comprises a number of coupling elements, each comprising:

two links which are each present on a side of the coupling element and which are each coupled to a corresponding link of a longitudinally adjacent coupling element;

a pin which extends in a transverse direction relative to the coupling elements at least over a straight central part thereof and is connected to the two links, and which has a part which protrudes beyond an outer surface of a link and is bent through at least 90°;

at least one of the links having a general U-shape, which U extends in the main plane of the conveyor belt and has a form widening toward an open end, such that a relatively narrow zone at a closed end fits into a relatively wide zone at the open end of an adjacent link;

the pin extending from the straight central part of the pin in a substantially fixed relative position through two first continuous holes in end zones of legs of the U-shape of a link, and in a non-fixed relative position through two second continuous holes in the legs at the position of the relatively narrow zone of a preceding link, the second holes being embodied as slotted holes extending in the longitudinal direction such that two mutually adjacent coupling elements can be moved out of the main plane and are mutually rotatable in the main plane;

wherein at least a most outward lying leg of at least one of the links has a third hole positioned between the first and the second hole of the most outward lying leg of at least one of the links;

a free end of the pin is inserted into the third hole of the link or a link of the adjacent coupling element; and the pin is substantially fixed relative to each link on sides of the conveyor belt.

2. The conveyor belt as claimed in claim 1, wherein the third hole forms part of the second hole.

3. The conveyor belt as claimed in claim 1, wherein the protruding, bent part of the pin has small dimensions such that the conveyor belt, when curved in the main plane, can assume a radius of curvature on the side directed toward the centre of curvature which is smaller than 3 times the width of the conveyor belt.

4. The conveyor belt as claimed in claim 1, wherein fixation of the pin to the link is ensured by a plastically deformed zone of the pin and/or link.

5. The conveyor belt as claimed in claim 4, wherein the pin has a widened zone, this zone being too wide to pass through the hole in the link, such that the pin is substantially fixed relative to the link by the widened zone and the bent part.

6. The conveyor belt as claimed in claim 5, wherein the widened zone is formed by flattening.

7. The conveyor belt as claimed in claim 5, wherein the widened zone is formed by a welding operation.

8. The conveyor belt as claimed in claim 1, wherein the pin and/or the link are comprised of plastic.

9. The conveyor belt as claimed in claim 1, wherein the pin and/or links are comprised of a metal.

10. The conveyor belt as claimed in claim 1, wherein the pin is fixed relative to the link by at least one welded connection.

11. The conveyor belt as claimed in claim 1, wherein a ratio between a radius of curvature of a neutral bend line and a diameter of the pin is smaller than 1.5.

12. The conveyor belt as claimed in claim 1, wherein the coupling elements are free of welded connections.

* * * * *

UNITED STATES PATENT AND TRADEMARK OFFICE
CERTIFICATE OF CORRECTION

PATENT NO.       : 8,544,638 B2
APPLICATION NO.  : 12/864759
DATED            : October 1, 2013
INVENTOR(S)      : Meulenkamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this
Fifteenth Day of September, 2015

Michelle K. Lee
*Director of the United States Patent and Trademark Office*